Jan. 22, 1963 SOICHIRO MATSUZAKI 3,074,337
AUTOMATIC DIAPHRAGM CONTROL FOR CAMERAS
Filed Oct. 17, 1960

United States Patent Office 3,074,337
Patented Jan. 22, 1963

3,074,337
AUTOMATIC DIAPHRAGM CONTROL
FOR CAMERAS
Soichiro Matsuzaki, 9/424 Omachi, Chofu, Tokyo, Japan
Filed Oct. 17, 1960, Ser. No. 62,912
Claims priority, application Japan Oct. 16, 1959
1 Claim. (Cl. 95—64)

This invention relates to a diaphragm device automatically controlled by an electrical exposure meter contained in a photographic camera.

An object of the invention is to improve a diaphragm device of the type described by ensuring that an exposure-time controlling ring and a cam member for controlling a diaphragm aperture can be driven as one unit and facilitating any correction for a photosensitivity of a photosensitive sheet material used.

Figure 1:
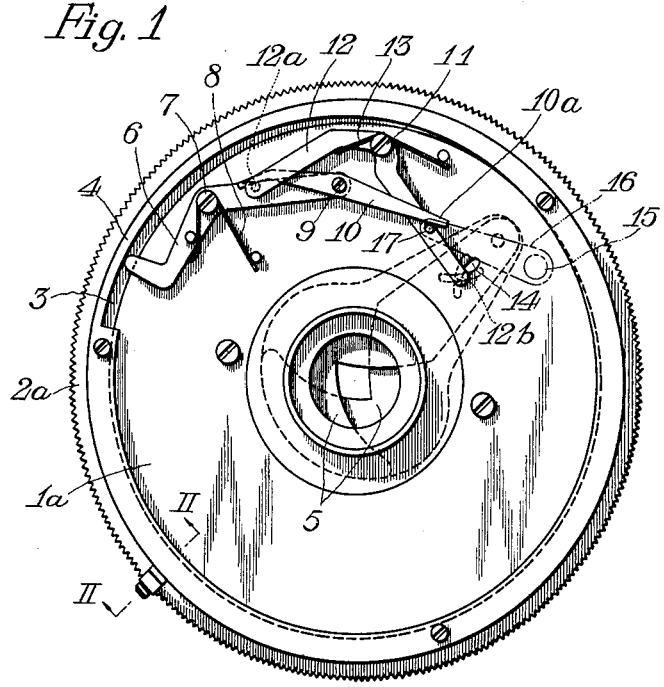
Figure 2:
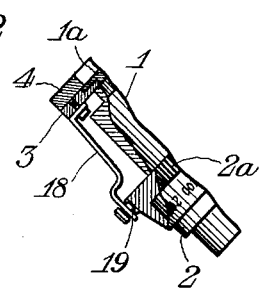

For better understanding of the invention, reference should be had to the following description taken in conjunction with the accompanying drawings in which:

FIG. 1 shows a plan view of an objective tube for a photographic camera with a diaphragm device of the invention as viewed on that side adapted to be attached to a camera housing; and FIG. 2 shows a fragmental elevational side view, partially in section of the objective tube illustrated in FIG. 1, the section being taken along the line II—II of FIG. 1.

Referring now to the drawings and more particularly to FIG. 2, the reference numeral 1 designates one portion of an objective tube or a main housing in which a lens shutter (not shown) for a photographic camera is accommodated and the reference numeral 2 a ring for controlling an exposure time. The ring 2 includes a knurled zone 2a formed on its rear periphery, a peripheral zone where figures as to a photosensitivity of a photosensitive sheet material to be loaded in the camera are indicated, and another peripheral zone where an exposure scale is graduated. The main housing 1 of the shutter includes an annular plate 1a secured concentrically thereto on the rear surface. A ring member 3 is rotatably disposed between the rear peripheral margin of the main housing 1 and the annular plate 1a and is provided on the rear surface with a ring-shaped cam member 4 secured concentrically thereto. The cam member 4 has an outside diameter substantially equal to that of the ring member 3 and an internal wall surface including one portion having a radius of curvature gradually varied. This portion serves as an operating cam surface.

A diaphragm device including a pair of sickle-shaped diaphragm sectors 5 disposed symmetrically with respect to an optical axis of a photographic objective (not shown) is pivotally mounted to the shutter housing in a suitable position as indicated by the dotted lines in FIG. 1. The sectors 5 are provided on the opposed edges with respective notches to form a diaphragm aperture substantially about the optical axis of the objective. The overlapped, pivoted end portions of the diaphragm sectors 5 include respective slots separated away from their common pivot, the slots intersecting each other to form a common through opening.

As shown in FIG. 1, a compensating lever 6 is mounted to the annular plate 1a at a fulcrum 7 adjacent to the operating cam surface of the cam member 4 and tends to be turned in the clockwise direction as viewed in FIG. 1, by the action of a spring 8. The lever 6 includes one arm having a curved end adapted to engage the operating cam surface of the cam member 4 and the other arm provided with a pin 9 serving as a fulcrum for a control lever 10. Further, the annular plate 1a includes a pin 11 secured thereto adjacent to the operating cam surface of the cam member 4 and longitudinally spaced from the fulcrum 7. The pin 11 serves as a fulcrum for an operating lever 12 which, in turn, tends to be rotated in the clockwise direction as viewed in FIG. 1, by the action of a relatively weak spring 13. The operating lever 12 includes one arm end provided with a pin 12a adapted to lightly press against the internal edge of the arm of the control lever 10 and the other arm end provided with a control pin 12b adapted to extend through a slot 14 formed on the annular plate 1a into the interior of the shutter housing until it engages, at the free end, the common opening formed of the intersected slots as previously mentioned.

The other arm end portion of the lever 10 includes an upright member 10a formed integrally therewith and adapted to contact an arm 16 secured to a shaft 15 which, in turn, is disposed in substantially parallel relationship with the optical axis of the photographic objective within the camera housing. The shaft 15 is adapted to be rotated in accordance with rotational movement of a movable part such as a moving coil in an electrical exposure meter (not shown) contained in the camera housing. The arm 16 is shown as being in a position corresponding to the inoperative state of the movable part due to a dark object to be photographed. As the movable part will be rotated in accordance with a brightness of an object to be photographed the arm 16 will be moved from the position shown in the clockwise direction as viewed in FIG. 1.

The ring member 3 includes a resilient strip 18 mounted thereto on the peripheral margin and extending toward the ring 2 for controlling the exposure time. The free end of the strip 18 is provided with a projection 19 secured thereto and adapted to resiliently engage any one of recesses in the knurled zone 2a of the exposure controlling ring 2 to thereby act as a click stop. Therefore, as the control ring 2 is manually rotated the annular plate 3 and the ring-shaped cam member 4 as one unit will be rotated about the axis of the photographic objective, through the resilient strip 18. The position of the strip 18 and hence the projection 19 or the click stop relative to the knurled zone 2a of the control ring 2 can be adjusted dependent upon a photosensitivity of a photosensitive sheet material used.

With the cam member 4 halted, the compensating lever 6 is not moved so that the pin 9 on the same, may be considered as being stationary. Under these conditions, if the arm 16 provided on the side of the camera housing will be moved in accordance with a brightness of an object to be photographed and in the clockwise direction as viewed in FIG. 1 then each of the levers 10 and 12 will be displaced counterclockwise whereby the pin 12b on the lever 12 will be displaced outwardly within the slot 14 and correspondingly the common opening in the diaphragm sectors 5 will be displaced in the same direction to decrease the area of the diaphragm aperture. Thus the diaphragm sectors 5 are automatically controlled by the exposure meter to be set to a position corresponding to the brightness of the object.

The exposure controlling ring 2 is then rotated to rotate the cam member 4 through the click stop 18, 19 in the same direction as does the ring 2. This effects the rotational movement of the lever 6 about its fulcrum resulting in the displacement of the pin 9 on the lever. This displacement of the pin 9 will vary the change in the area of the diaphragm aperture for a predetermined rotational movement of the arm 16. If the variation in the exposure time will be inversely proportional to the change in the area of the diaphragm aperture, a light input to the photosensitive sheet material will not be changed. In this way, the present diaphragm device interlocked with the electrical exposure meter can be also properly compensated for any change due to exposure control whereby it can be effectively used.

From the foregoing it will be appreciated that, according to the present invention a ring-shaped cam member for compensating for any change due to the adjustment of exposure time is concentrically carried by a shutter housing on the peripheral margin and adapted to be, as one unit, rotated with an exposure-time controlling ring through a click stop. The cam member includes its operating cam surface formed on the internally peripheral surface so that the correction for a photosensitivity of a photosensitive sheet material can also be easily effected.

Simultaneously, the invention is very advantageous in that various levers and the like cooperating with the operating cam surface of the cam member to compensate for the change due to the adjustment of exposure time can be disposed on the rear surface of a shutter housing.

While the invention has been described in conjunction with a photographic camera including a housing of a lens shutter it may be equally applied to motion-picture cameras. In the latter case, the invention may be combined with a device for switching film feeding rate or a device for changing aperture angle between rotary shutter sectors, instead of an exposure controlling ring in a still-camera.

What I claim is:

In a photographic camera having a light meter; an improved diaphragm device automatically controlled by said light meter and comprising: a pair of sickle-shaped diaphragm sectors disposed symmetrically with respect to the optical axis of a photographic objective and pivotably mounted at the overlapped end portions thereof to a stationary member in the camera, said overlapped end portions of the diaphragm sectors being provided with respective slots crossing each other to form a common intersection; a control pin fitted in said intersection, said control pin being displaceable in said slots to move said intersection with respect to said slots and thereby control the area of a diaphragm aperture defined by opposed notches formed on the diaphragm sectors; a ring-shaped cam member carried concentrically on a peripheral margin of a shutter housing for rotation; said cam member having an interior peripheral surface, a portion of which is a cam surface; a manually set exposure-time controlling ring operatively coupled to said cam member through a click-stop; a pair of levers mounted on the rear surface of the shutter housing, one of said pair of levers having one end abutting against said cam surface of said cam member, the other of said pair of levers carrying at one end a pin and at the other end said control pin fitted into said intersection of the slots in the diaphragm sectors; a third lever fulcrumed on the other end of said one of said pair of levers and having ends, one end engaging the pin at the one end of the other of said pair of levers, and the other end engaging a pin actuated by the light meter, thereby operably interlocking said light meter with said levers and operably connecting said exposure-time controlling ring with said diaphragm sectors.

References Cited in the file of this patent

UNITED STATES PATENTS 2,421,499   Guedon _____ June 3, 1947

FOREIGN PATENTS 690,079   Great Britain _____ Apr. 8, 1953